(12) United States Patent
Zhao et al.

(10) Patent No.: US 10,355,904 B2
(45) Date of Patent: Jul. 16, 2019

(54) TRANSMITTER, RECEIVER AND SYSTEM FOR FILTERBANK MULTICARRIER COMMUNICATION

(71) Applicant: Huawei Technologies Duesseldorf GmbH, Dusseldorf (DE)

(72) Inventors: Zhao Zhao, Munich (DE); Nikola Vucic, Munich (DE); Malte Schellmann, Munich (DE)

(73) Assignee: Huawei Technologies Duesseldorf GmbH, Dusseldorf (DE)

( * ) Notice: Subject to any disclaimer, the term of this patent is extended or adjusted under 35 U.S.C. 154(b) by 338 days.

(21) Appl. No.: 15/289,732

(22) Filed: Oct. 10, 2016

(65) Prior Publication Data

US 2017/0026215 A1 Jan. 26, 2017

Related U.S. Application Data

(63) Continuation of application No. PCT/EP2014/057096, filed on Apr. 8, 2014.

(51) Int. Cl.
*H04L 5/00* (2006.01)
*H04L 12/26* (2006.01)
(Continued)

(52) U.S. Cl.
CPC ............ *H04L 27/264* (2013.01); *H04L 5/005* (2013.01); *H04L 25/0224* (2013.01); *H04L 25/03006* (2013.01); *H04L 27/261* (2013.01); *H04L 27/34* (2013.01); *H04L 47/125* (2013.01); *H04L 43/18* (2013.01)

(58) Field of Classification Search
CPC .................................................. H04L 27/264
See application file for complete search history.

(56) References Cited

U.S. PATENT DOCUMENTS

2007/0161361 A1* 7/2007 Vaisanen ............ H04B 1/1036
455/302
2010/0027608 A1 2/2010 Priotti

FOREIGN PATENT DOCUMENTS

CN 1996781 A 7/2007
CN 102439863 A 5/2012
(Continued)

OTHER PUBLICATIONS

Lele et al., "Channel estimation methods for preamble-based OFDM/OQAM modulations," France Telecom, Cedex, France (2008).
(Continued)

*Primary Examiner* — Brandon M Renner
*Assistant Examiner* — Abdeltif Ajid
(74) *Attorney, Agent, or Firm* — Leydig, Voit & Mayer, Ltd.

(57) ABSTRACT

The present invention is directed to a transmitter and receivers for filterbank multicarrier (FBMC) communication. The transmitter comprises a processor adapted to calculate two auxiliary pilot symbols, and a precoder adapted to insert the two calculated auxiliary pilot symbols into a symbol structure of symbols, the symbols adjacently surrounding a main pilot symbol, wherein the precoder is adapted to insert the two auxiliary pilot symbols at two symbol positions of the symbol structure, which are symmetric to the main pilot symbol P in a time domain and/or in a frequency domain.

16 Claims, 6 Drawing Sheets

(51) Int. Cl.
*H04L 25/02* (2006.01)
*H04L 25/03* (2006.01)
*H04L 27/26* (2006.01)
*H04L 27/34* (2006.01)
*H04L 12/803* (2013.01)

(56) References Cited

FOREIGN PATENT DOCUMENTS

| WO | WO-2008007019 A2 * | 1/2008 | ......... H04L 25/0228 |
|----|---|---|---|
| WO | WO 2008007019 A2 | 1/2008 | |

OTHER PUBLICATIONS

Javaudin et al., "Pilot-Aided Channel Estimation for OFDM/OQAM," pp. 1581-1585, Institute of Electrical and Electronics Engineers, New York, New York (2003).

"Some practical aspects for OFDM/OQAM channel estimation," 3GPP TSG RAN WG1#43, Seoul, Korea, R1-051458, $3^{rd}$ Generation Partnership Project, Valbonne, France (Nov. 7-11, 2005).

Lele et al., "Channel Estimation with Scattered Pilots in OFDM/OQAM," IEEE SPAWC, pp. 286-290, Institute of Electrical and Electronics Engineers (2008).

Lele et al., "Iterative Scattered Pilot Channel Estimation in OFDM/OQAM," IEEE Signal Processing Advances in Wireless Communications, Institute of Electrical and Electronics Engineers, New York, New York (2009).

Kofidis et al., "Preamble-based channel estimation in OFDM/OQAM systems: A review," Signal Processing 93, pp. 2038-2054, Science Direct Elsevier (2013).

* cited by examiner

TRANSMITTER, RECEIVER AND SYSTEM FOR FILTERBANK MULTICARRIER COMMUNICATION

CROSS-REFERENCE TO RELATED APPLICATIONS

This application is a continuation of International Application No. PCT/EP2014/057096, filed on Apr. 8, 2014, the disclosure of which is hereby incorporated by reference in its entirety.

TECHNICAL FIELD

The present invention relates to a transmitter, a receiver and a system for filterbank multicarrier (FBMC) communication. In particular, the transmitter, receiver and system can communicate via data packets, which include scattered pilot symbol structures each having at least a main pilot symbol and two auxiliary pilot symbols. The present invention also relates to corresponding transmission and receiving methods, respectively.

BACKGROUND

FBMC transmission with offset quadrature-amplitude modulation (OQAM) is one of the candidate transmission schemes for future wireless systems, e.g. for 5G systems. In contrast to the state of the art, particularly in contrast to the cyclic-prefix orthogonal frequency division multiplexing (CP-OFDM) transmission scheme, the FBMC/OQAM transmission scheme has the advantages of a better control of the out-of-band radio power leakage and of a higher spectral efficiency.

Similar to CP-OFDM, the FBMC/OQAM transmission scheme typically uses scattered pilot symbol structures, i.e. pilot symbol structures that are distributed in the frequency and time domain, in order to dynamically estimate a channel response of a transmission channel at a receiver side. Due to the estimation of the transmission channel, coherent detection, e.g. frequency-domain channel equalization, at the receiver side is possible.

Contrary to CP-OFDM, symbols conveyed with the FBMC/OQAM transmission scheme on each FBMC subcarrier are OQAM modulated. For such OQAM modulated symbols, the orthogonality of the symbols detected at the receiver side is—even under ideal transmission channel conditions—only withheld in the real field domain, i.e.

$$\mathrm{Re}\{<s_{m,n}s_{m',n'}^*>\}=\delta_{m',m}\delta_{n',n}$$

where s is a basis function for a transmission signal expansion, m is subcarrier index, n is a time index, $<\cdot>$ is the inner product, and $\delta$ is the Kronecker delta function.

Therefore, in order to accurately estimate the (complex) channel response on a certain pilot symbol at the receiver side, the state of the art suggests inserting at the transmitter side an auxiliary pilot symbol into the symbol structure near the main pilot symbol. The auxiliary pilot symbol is predominantly inserted, in order to pre-cancel imaginary intrinsic interference leaked from the neighbouring symbols and induced by the filterbanks. For example, such a proposal was made in the following references [1], [2], and [3]

[1] J. P. Javaudin, D. Lacroix and A. Rouxel, "*Pilot-aided channel estimation for OFDM/OQAM*", VTC'03 spring, April 2003.

[2] C. Lélé, "*OFDM/OQAM modulation: Channel estimation methods, and applications to Multicarrier CDMA and multi-antenna transmission*", PhD thesis, CNAM, Nov. 18, 2008.

[3] WO 2008/007019

For example, the reference [1] proposes to insert, as also illustrated in FIG. 1 in (a), one auxiliary pilot symbol $A_8$ into the symbol structure 110 arranged around the main pilot symbol P. FIG. 1 shows in (a) a prototype filter radiation map on the left hand side, and the symbol structure 110 on the right hand side. In FIG. 1 the vertical axis of the symbol structure 110 defines subcarriers in a frequency domain, and the horizontal axis of the symbol structure 110 defines symbols in a time domain. In order to pre-cancel the imaginary interference experienced at the position of the main pilot symbol P corresponding to the position "0" in the prototype filter radiation map, which is influenced by the prototype filter responses $\gamma_1 \ldots \gamma_8$, the auxiliary pilot symbol $A_8$ is calculated by $$A_8 = -\sum_{i=\Omega} \frac{d_i \gamma_i}{\gamma_8} = \frac{\sum_{i\in\Omega\backslash\{7\}} d_i\gamma_i + d_7\gamma_7}{\gamma_8}$$

where $d_1 \ldots d_7$ are modulated payload symbols of the symbol structure 110, $\gamma_1 \ldots \gamma_8$ are the prototype filter responses at the corresponding positions of the symbols $d_1 \ldots d_7$ and $A_8$, and $\Omega=\{1, 2, \ldots, 8\}$.

However, in some cases it may happen that the transmission channel strongly distorts the reception signal detected at the receiver side, e.g. due to a high delay spread or a high Doppler spread channel, so that the perfect real field orthogonality of the detected symbols is not withheld, and the main pilot symbol P experiences strong interference. This interference can significantly deteriorate the channel estimation performance conducted at the receiver side, and thus may lead to a poor bit error rate (BER) and/or block error rate (BLER) performance.

For instance, when a FBMC transmitter transmits on a 3GPP-ETU (extended urban) transmission channel with a long delay spread, the main pilot symbols P are strongly distorted by the interference, so that the overall transmission performance (in terms of BER/BLER) is substantially decreased.

To alleviate this problem, the state of the art, for example the following reference [4], proposes to iteratively cancel the interference by feeding back detected neighbouring payload symbols. However, this detection method is very complex to implement.

[4] C. Lele., R. Legouable., P. Siohan, "*Iterative scattered pilot channel estimation in OFDM/OQAM*" Signal Processing Advances in Wireless Communications, 2009. SPAWC '09. IEEE 10th Workshop, vol., no., pp. 176-180, 21-24 Jun. 2009.

The detection method proposed in reference [4] also brings challenges to the practical system design. In particular, the challenges to the practical system design arise, because in some cases pilot symbols common to several users are closely allocated to the dedicated payload symbols. This means that the receiver side must detect/decode the surrounding payload symbols belonging to other users, in order to perform a common channel estimation and synchronization. Moreover, in multiple-input and multiple-output (MIMO) precoding cases, the surrounding payload symbols may be channel-dependently precoded. Thus, other users may suffer from a huge loss in detection accuracy of the pilot symbols, when performing iterative channel estimation.

A state of the art FBMC transmitter comprises typically a OQAM pre-modulator, synthesis filterbank (SFB) with a prototype filter p(t). A state of the art FBMC receiver comprises typically an analysis filterbank (AFB) with a receiving prototype filter g(t) matching the transmitting prototype filter p(t), a channel estimator, a channel equalizer, and a OQAM post-demodulator. The transmitting prototype filter p(t) and the receiving prototype filter g(t) are configurable system parameters.

For example, a state of the art receiver 100 as proposed in reference [3] is shown in FIG. 1 in (b). The receiver 100 is proposed, in order to estimate and cancel the interference at the main pilot symbol position ("0"). The receiver 100 has an OQAM AFB 101, a channel estimator 102, a sub-channel equalizer 103, a detector/decoder 104, and an interference estimator 105. Iterations of the channel estimation based on an estimated interference estimation, which is fed back from the interference estimator 105 to the channel estimator 102, are jointly conducted with all related neighbouring symbols. This, however, not only increases substantially the complexity of the receiver 100, but also introduces error propagation from all wrongly detected symbols.

In summary, the state of the art is very vulnerable to distortions of the transmission channel, in particular when the distortion is caused by a long delay spread. The state of the art also proposes only highly complex systems to address this problem, specifically systems complex in terms of receiver design and an impractical frame design. The disadvantages of the state of the art arise mainly from the condition of OQAM real-field orthogonality and the limited performance of localized FBMC pulse shaping under highly distorted channels.

For instance, it can be analytically proven that for the proposal of reference [3] under the assumption of a high channel distortion, each transmitted pilot symbol suffers strongly from the intrinsic interference in both time and frequency dimensions and hence yields a very poor transmission performance. Especially in the high signal-to-noise-ratio (SNR) region, the interference is significantly stronger than the thermal noise, and significantly deteriorates the transmission performance so that an error floor is exhibited in BER/BLER curves.

SUMMARY

In view of the above-mentioned disadvantages and problems, embodiments of the present invention aim to improve the state of the art. In particular, the object of embodiments of the present invention is to provide a transmitter, a receiver, and a system, respectively, which may be employed to improve FBMC transmission performance, while introducing only very minor additional complexity into the system. Thereby, embodiments of the present invention also intend to respect the frame design principles.

The above-mentioned object of embodiments of the present invention is achieved by the solution provided in the enclosed independent claims. Advantageous implementations of embodiments of the present invention are further defined in the respective dependent claims. In particular, contrary to the state of the art, the solution of the independent claims proposes to insert a pair of auxiliary pilot symbols into the symbol structure surrounding the main pilot symbol.

A first aspect of an embodiment of the present invention provides a transmitter for FBMC communication, comprising: a processor adapted to calculate two auxiliary pilot symbols, and a precoder adapted to insert the two calculated auxiliary pilot symbols into a symbol structure of symbols, the symbols adjacently surrounding a main pilot symbol, wherein the precoder is adapted to insert the two auxiliary pilot symbols at two symbol positions of the symbol structure, which are symmetric to the main pilot symbol in a time domain and/or in a frequency domain.

The transmitter of an embodiment of the present invention uses an auxiliary pilot symbol pair, which facilitates channel estimation at the receiver side. The auxiliary pilot symbol pair is preferably inserted at positions around the main pilot symbol, which contribute most significantly to the intrinsic interference, which is experienced by the pilot symbols and is influenced by localization properties of the prototype filters. By using the two auxiliary pilot symbols, the main pilot symbol may be iteratively detected at the receiver side without considering any other neighbouring payload symbols. Thereby, the channel estimation with the proposed auxiliary pilot symbol pair can significantly improve the FBMC transmission performance and may even come close to an interference-free case, which corresponds to the perfect channel estimation. At the same time, the solution with the two symmetric auxiliary pilot symbols is very simple, and thus does not add too much complexity into the system.

The symmetric design of the auxiliary pilot symbol pair allows supporting receiving and detecting of the auxiliary pilot symbols by a combining operation at the receiving side. Thereby, fading effects can be mitigated, and error propagation due to a possibly incorrect feedback decision can be prevented.

In a first implementation form of the transmitter according to the first aspect, the processor is adapted to include interference information into at least one of the two calculated auxiliary pilot symbols, wherein the interference information is calculated based on payload information carried by the other symbols of the symbol structure, in order to compensate for the intrinsic interference, affecting the main pilot symbol.

The auxiliary pilot symbols including interference information help to compensate for the intersymbol interference (ISI) when inserted into the symbol structure. Therefore, the receiving and detecting of the main pilot symbol can be improved at the receiver side. Thus, also the performance of the FBMC communication in general can be enhanced.

In a second implementation form of the transmitter according to the first implementation form of the first aspect, the processor is adapted to divide, preferably scramble, the interference information between the two auxiliary pilot symbols.

Thereby, the problem of compensating the ISI can be effectively addressed. Preferably, the processor is adapted to divide, preferably scramble, the interference information equally between the two auxiliary pilot symbols.

In a third implementation form of the transmitter according to the first aspect as such or according to any implementation forms of the first aspect, the processor is adapted to include payload information corresponding to one symbol into at least one of the two auxiliary pilot symbols.

By including the payload information corresponding to one symbol, it can be ensured that the bandwidth of the FBMC communication adapting the proposed solution with two auxiliary pilot symbols is not reduced in respect to the prior art, which uses only one auxiliary pilot symbol.

In a fourth implementation form of the transmitter according to the third implementation form of the first aspect, the processor is adapted to divide, preferably scramble, the payload information between the two auxiliary pilot symbols.

The symmetry of the payload information can make it easier to decode the payload information at the receiver side. Preferably, the processor is adapted to divide, preferably scramble, the payload information equally between the two auxiliary pilot symbols.

In a fifth implementation form of the transmitter according to the third or fourth implementation form of the first aspect, the processor is adapted to twist the payload information included in at least one of the two auxiliary pilot symbols by a twisting vector.

By applying the twisting vector, the power of the received auxiliary pilot symbols may be maximally boosted.

In a sixth implementation form of the transmitter according to the fifth implementation form of the first aspect, the processor is adapted to calculate the two auxiliary pilot symbols according to the following formulas $$A_7 = \frac{1}{2}(d_7)V_{t,1} - \frac{1}{2}\sum_{i\in\Omega\setminus\{7,8\}} \frac{d_i \gamma_i}{\gamma_7}$$

$$A_8 = \frac{1}{2}(-d_7)V_{t,2} - \frac{1}{2}\sum_{i\in\Omega\setminus\{7,8\}} \frac{d_i \gamma_i}{\gamma_8}$$

with a first auxiliary pilot symbol $A_7$, a second auxiliary pilot symbol $A_8$, the twisting vector $V_t=[V_{t,1}, V_{t,2}]$, the included payload information $d_7$, $\Omega$ being a set of neighboring resource grids influencing the main pilot symbol, the payload information $d_i$ carried by the other symbols of the symbol structure, and filterbank response information $\gamma_i$.

A second aspect of an embodiment of the present invention provides a receiver for FBMC communication, comprising: an analyzer adapted to extract from at least one FBMC data packet received via a transmission channel a main pilot symbol and two auxiliary pilot symbols included in a symbol structure of symbols, the symbols adjacently surrounding the main pilot symbol, and a channel estimator adapted to estimate a channel response of the transmission channel based on the main pilot symbol and based on the two auxiliary pilot symbols.

The two auxiliary pilot symbols can allow for a more accurate detection of the main pilot symbol, and thus for a better channel estimation, even in case the transmission channel is strongly distorted. Thereby, the performance of the FBMC communication can be generally improved.

In a first implementation form of the receiver according to the second aspect, the receiver further comprises: a detector adapted to extract from the two auxiliary pilot symbols payload information corresponding to one symbol, and an interference estimator adapted to calculate an interference estimation of the interference from the two auxiliary pilot symbols on the main pilot symbol, wherein the channel estimator is adapted to estimate the channel response of the transmission channel based on the main pilot symbol and the interference estimation.

The interference estimator is well able to estimate particularly the intrinsic interference that is experienced by the main pilot symbol from the prototype filters corresponding to the position of the auxiliary pilot symbols. Therefore, a better channel estimation based on the main pilot symbol is possible.

In a second implementation form of the receiver according to the first implementation form of the second aspect, the receiver further comprises: an equalizer adapted to calculate two equalized auxiliary pilot symbols based on the two auxiliary pilot symbols received from the analyzer and based on two channel estimates corresponding to time and/or frequency instants of the two auxiliary pilot symbols, the two channel estimates being calculated by and received from the channel estimator, wherein the detector is adapted to extract the payload information from the two equalized auxiliary pilot symbols.

In a third implementation form of the receiver according to the second implementation form of the second aspect, the detector is adapted to extract the payload information by performing a combining operation on the two equalized auxiliary pilot symbols.

By separately detecting the payload information by performing the combining operation on the received auxiliary pilot symbols, the proposed receiving process can converge faster to the most significant part of the real interference, while at the same time the robustness against channel fading effects can be improved and error propagation can be prevented. In many cases it can be even enough to make one iteration step, in order to converge to the optimal performance of channel estimation.

In a fourth implementation form of the receiver according to the second or third implementation form of the second aspect, the receiver further comprises a de-twister adapted to supply a twisting vector to the detector, wherein the detector is adapted to extract the payload information from the two equalized auxiliary pilot symbols using the twisting vector.

In a fifth implementation form of the receiver according to any of the second to fourth implementation forms of the second aspect, the channel estimator is adapted to iteratively estimate the channel response of the transmission channel based on the main pilot symbol and the interference estimation until: a difference between at least one of the two channel estimates calculated in one iteration step and at least one channel estimate calculated in a preceding iteration step is below a predetermined threshold value, or a predetermined maximum number of iteration steps is reached.

On the basis of at least the above explanations, the receiver is able to achieve a near optimal performance, while still being able to operate fast and efficiently.

In a third aspect an embodiment of the present invention provides a system for FBMC communication, comprising: a transmitter according to the first aspect as such or according to any implementation form of the first aspect, and a receiver according to the second aspect as such or according to any implementation form of the second aspect.

The system of the third aspect is able to employ all effects and advantages described above for the transmitter and receiver of the first and second aspect, respectively.

In a fourth aspect an embodiment of the present invention provides a transmission method for FBMC communication, comprising the method steps of: calculating two auxiliary pilot symbols, and inserting the two calculated auxiliary pilot symbols into a symbol structure of symbols, the symbols adjacently surrounding a main pilot symbol, wherein the two auxiliary pilot symbols are inserted at two symbol positions of the symbol structure, which are symmetric to the main pilot symbol in a time domain and/or in a frequency domain.

In a first implementation form of the transmission method according to the fourth aspect, the method comprises the further step of: including interference information into at least one of the two calculated auxiliary pilot symbols, wherein the interference information is calculated based on payload information carried by the other symbols of the symbol structure, in order to compensate for the intrinsic interference affecting the main pilot symbol.

In a second implementation form of the transmission method according to the first implementation form of the fourth aspect, the method further comprises the step of: dividing, preferably scrambling, the interference information between the two auxiliary pilot symbols.

In a third implementation form of the transmission method according to the fourth aspect as such or according to any implementation forms of the fourth aspect, the method further comprises the step of: including payload information corresponding to one symbol into at least one of the two auxiliary pilot symbols.

In a fourth implementation form of the transmission method according to the third implementation form of the fourth aspect, the method further comprises the step of: dividing, preferably scrambling, the payload information between the two auxiliary pilot symbols.

In a fifth implementation form of the transmission method according to the third or fourth implementation form of the fourth aspect, the method further comprises the step of: twisting the payload information included in at least one of the two auxiliary pilot symbols by a twisting vector.

In a sixth implementation form of the transmission method according to the fifth implementation form of the fourth aspect, the method further comprises the step of: calculating the two auxiliary pilot symbols according to the following formulas $$A_7 = \frac{1}{2}(d_7)V_{t,1} - \frac{1}{2}\sum_{i\in\Omega\setminus\{7,8\}} \frac{d_i\gamma_i}{\gamma_7}$$

$$A_8 = \frac{1}{2}(-d_7)V_{t,2} - \frac{1}{2}\sum_{i\in\Omega\setminus\{7,8\}} \frac{d_i\gamma_i}{\gamma_8}$$

with a first auxiliary pilot symbol $A_7$, a second auxiliary pilot symbol $A_8$, the twisting vector $V_t=[V_{t,1}, V_{t,2}]$, the included payload information $d_7$, $\Omega$ being a set of neighboring resource grids influencing the main pilot symbol, the payload information $d_i$ carried by the other symbols of the symbol structure, and filter bank response information $\gamma_i$.

In a fifth aspect an embodiment of the present invention provides a reception method for FBMC communication, comprising the method steps of: extracting from at least one FBMC data packet received via a transmission channel a main pilot symbol and two auxiliary pilot symbols included in a symbol structure of symbols, the symbols adjacently surrounding the main pilot symbol, and estimating a channel response of the transmission channel based on the main pilot symbol and based on the two auxiliary pilot symbols.

In a first implementation form of the reception method according to the fifth aspect, the method further comprises the steps of: extracting from the two auxiliary pilot symbols payload information corresponding to one symbol, and calculating an interference estimation of the interference from the two auxiliary pilot symbols on the main pilot symbol, wherein the channel response of the transmission channel is estimated based on the main pilot symbol and the interference estimation.

In a second implementation form of the reception method according to the first implementation form of the fifth aspect, the method further comprises the steps of: calculating two equalized auxiliary pilot symbols based on the two auxiliary pilot symbols and based on two channel estimates corresponding to time and/or frequency instants of the two auxiliary pilot symbols, wherein the payload information is extracted from the two equalized auxiliary pilot symbols.

In a third implementation form of the reception method according to the second implementation form of the fifth aspect, the method further comprises the step of: extracting the payload information by performing a combining operation on the two equalized auxiliary pilot symbols.

In a fourth implementation form of the reception method according to the second or third implementation form of the fifth aspect, the method further comprises the steps of: supplying a twisting vector, and extracting the payload information from the two equalized auxiliary pilot symbols using the twisting vector.

In a fifth implementation form of the reception method according to any of the second to fourth implementation forms of the fifth aspect, the method further comprises the steps of: iteratively estimating the channel response of the transmission channel based on the main pilot symbol and the interference estimation until: a difference between at least one of the two channel estimates calculated in one iteration step and at least one channel estimate calculated in a preceding iteration step is below a predetermined threshold value, or a predetermined maximum number of iteration steps is reached.

The methods of the fourth and fifth aspects can achieve the same effects and advantages as described above for the transmitter and receiver of the first and second aspect, respectively.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of embodiments of the present invention will be explained in the following description of specific embodiments in relation to the enclosed drawings, in which.

DETAILED DESCRIPTION OF EMBODIMENTS

Figure 1:
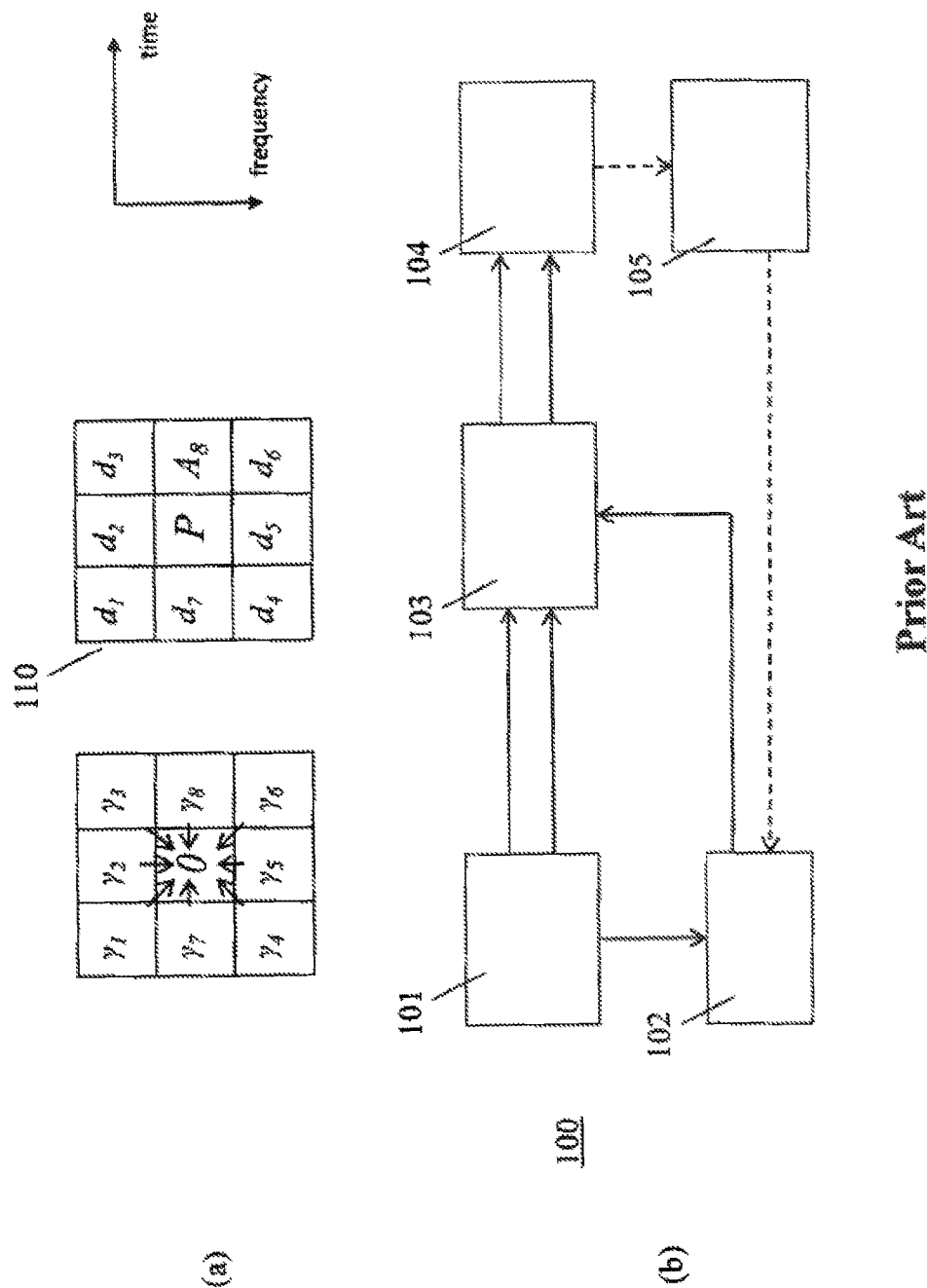
FIG. 1 shows in (a) a symbol structure of the state of the art with a main pilot symbol and an auxiliary pilot symbol, and shows in (b) a receiver according to the state of the art.
Figure 2:
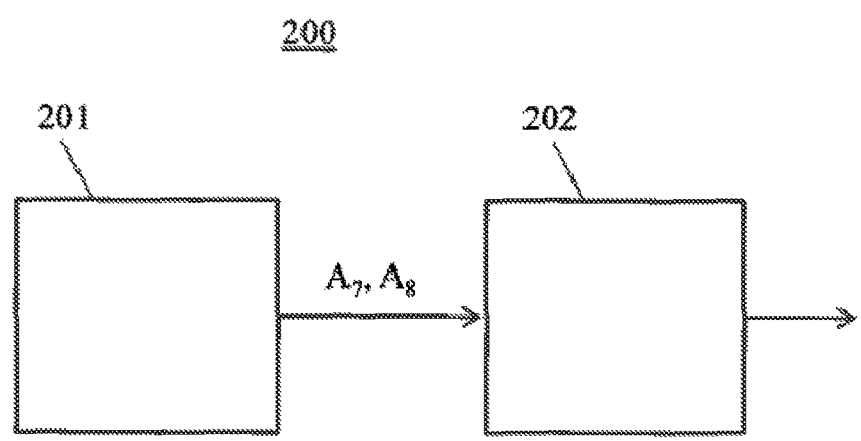
FIG. 2 shows a transmitter according to an embodiment of the present invention.

FIG. 2 shows a transmitter 200 according to an embodiment of the present invention. The transmitter 200 includes a processor 201, which is at least adapted to calculate two auxiliary pilot symbols $A_7$ and $A_8$. The processor 201 may be any kind of controller, e.g. a microcontroller, or any calculating unit. Preferably, the pair of auxiliary pilot symbols $A_7$ and $A_8$ is calculated by the processor 201 according to the formulas:

$$A_7 = \frac{1}{2}(d_7)V_{t,1} - \frac{1}{2}\sum_{i \in \Omega\setminus\{7,8\}} \frac{d_i \gamma_i}{\gamma_7}$$

$$A_8 = \frac{1}{2}(-d_7)V_{t,2} - \frac{1}{2}\sum_{i \in \Omega\setminus\{7,8\}} \frac{d_i \gamma_i}{\gamma_8}$$

In the formulas, $V_t=[V_{t,1}, V_{t,2}]$ is a cell specific parameter and indicates a twisting vector, which may optionally be used, in order to boost the pilot symbol power during a receiving process. In particular, if $V_t=[\text{sgn}(\gamma_7), -\text{sgn}(\gamma_8)]$, the power of the received pilot symbol including intrinsic interference is maximally boosted. In the formulas, $d_7$ is payload information corresponding to one symbol, $\Omega$ is a set of neighboring resource grids influencing the main pilot symbol P, $d_i$ is the payload information carried by the other symbols of the symbol structure, $\gamma_i$ is filterbank response information, and sgn(•) is the sign function.

From the above formulas it can be seen that the payload information $d_7$ corresponding to one symbol can be included into at least one of the two auxiliary pilot symbols $A_7$ and $A_8$, and is preferably equally divided between the two, as indicated by the factor ½ in the formulas. The same is true for interference information, which is preferably also included into the two calculated auxiliary pilot symbols $A_7$ and $A_8$. The interference information can be calculated based on payload information carried by the other symbols of the symbol structure, in order to compensate for the intrinsic interference, affecting the main pilot symbol. The interference information is included through the filterbank response information $\gamma_i$, which is a measure for how strong the respective prototype filters influence the symbol position of the main pilot symbol P. However, it is also possible to divide and/or to scramble said payload information $d_7$ and/or the interference information unequally between the two auxiliary pilot symbols $A_7$ and $A_8$, for example by using instead of the two factors ½, factors ⅓ and ⅔, or factors ¼ and ¾, or factors ⅕ and ⅗ and so on in the formulas of the two auxiliary pilot symbols $A_7$ and $A_8$ (or vice versa).

The processor 201 can twist the payload information included in at least one of the two auxiliary pilot symbols by the twisting vector.

The transmitter 200 further includes a precoder 202, which receives the calculated auxiliary pilot symbols $A_7$ and $A_8$ from the processor 201, and is at least adapted to insert the two calculated auxiliary pilot symbols $A_7$ and $A_8$ into a symbol structure of symbols, which is explained below in respect to FIG. 3. In particular, the precoder 202 is adapted to insert the two auxiliary pilot symbols $A_7$ and $A_8$ at two symbol positions of the symbol structure, which are symmetric to the main pilot symbol P in a time domain and/or in a frequency domain. The precoder 202 is also adapted to output the symbol structure. The precoder 202 may, for example, be an OQAM pre-modulator.

Figure 3:
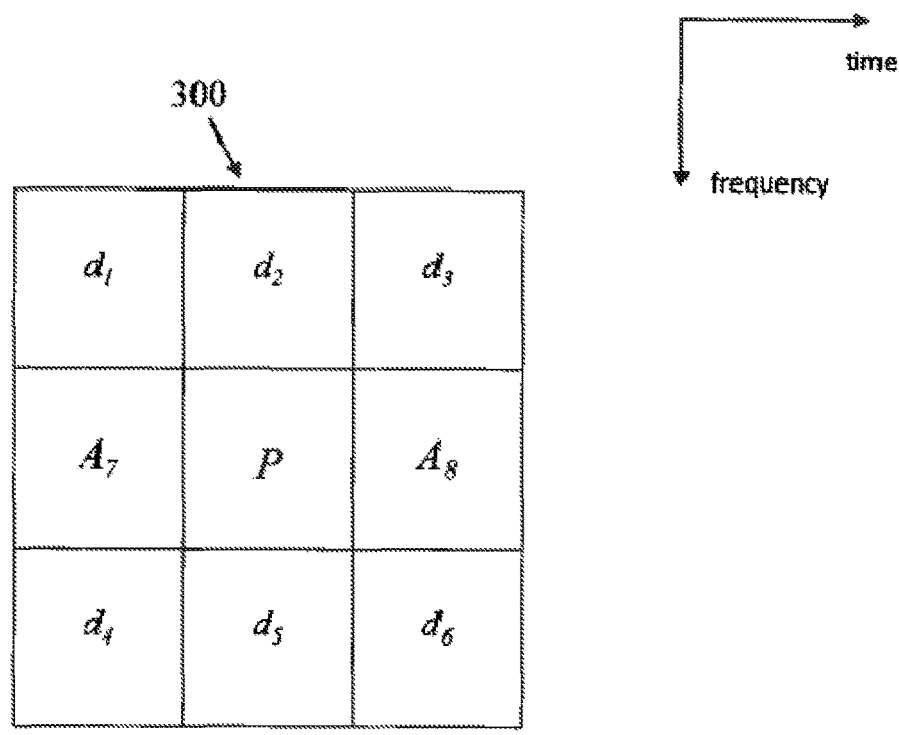
FIG. 3 shows a symbol structure with a main pilot symbol and two auxiliary pilot symbols as used by embodiments of the present invention.

FIG. 3 shows an example of a symbol structure 300 that may be output from the precoder 202. The symbol structure 300 includes a main pilot symbol P and eight other symbols $d_1$-$d_6$, $A_7$ and $A_8$, which adjacently surround the main pilot symbol P in the time domain and the frequency domain, respectively. Symbols arranged at the same frequency in the time domain can be different time slots. Symbols arranged at the same time instant in the frequency domain can be different subcarriers.

Two of the eight other symbols surrounding the main pilot symbol P are the auxiliary pilot symbols $A_7$ and $A_8$ as inserted by the precoder 202. The auxiliary pilot symbols $A_7$ and $A_8$ shown in FIG. 3 are inserted symmetrically in respect to the main pilot symbol P in the time domain, i.e. "horizontally". In other words, payload symbols $d_7$ and $d_8$ as they would exist in a symbol structure without any auxiliary pilot symbols are replaced by the auxiliary pilot symbols $A_7$ and $A_8$, respectively. However, as will be explained later in respect to FIG. 6, the auxiliary pilot symbols may also be inserted symmetrically to the main pilot symbol P in a frequency domain, i.e. "vertically", or in a time and frequency domain, i.e. "diagonally". The auxiliary pilot symbols $A_7$ and $A_8$ should be inserted according to the localization properties of the prototype filters, which may be different for different transmission schemes. In particular, the auxiliary pilot symbols $A_7$ and $A_8$ should be inserted at those positions around the main pilot symbol P, which, according to localization properties of the prototype filters, influence the main pilot symbol P the strongest, i.e. which cause the strongest intrinsic interference experienced by the main pilot symbol P.

Figure 4:
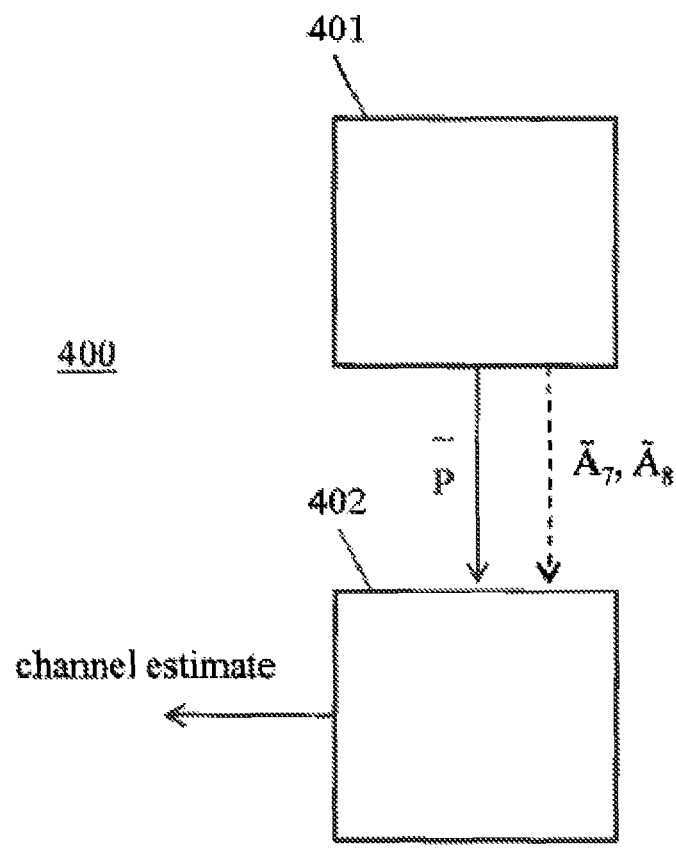
FIG. 4 shows a receiver according to an embodiment of the present invention.

FIG. 4 shows a receiver 400 of an embodiment of the present invention. The receiver 400 includes an analyzer 401, which may be an OQAM AFB. The analyzer 401 is at least adapted to extract from at least one FBMC data packet received via a transmission channel, from for example the receiver 200, the main pilot symbol $\tilde{P}$ and the two auxiliary pilot symbols $\tilde{A}_7$ and $\tilde{A}_8$ included in the symbol structure 300 by the precoder 202 of the transmitter 200. It is noted that in respect to the symbols labeled with "P", "$A_7$" and "$A_8$", the symbols "$\tilde{P}$", "$\tilde{A}_7$" and "$\tilde{A}_8$" denote the detected pilot symbol and auxiliary pilot symbols at the receiver side, which may be different than the symbols inserted at the transmitter side, due to the imperfect transmission channel, but are identical to the transmitted symbols in the ideal case.

The receiver 400 includes further a channel estimator 402, which may be adapted to carry out least square error (LSE) or local interpolation as known from the state of the art OFDM scheme. The channel estimator 402 is at least adapted to estimate and output a channel response of the transmission channel based on the detected main pilot symbol $\tilde{P}$ and based on the two detected auxiliary pilot symbols $\tilde{A}_7$ and $\tilde{A}_8$. The channel estimator 402 is further adapted to calculate and output channel estimates $\hat{h}_7$ and $\hat{h}_8$ corresponding to the time and/or frequency instants of the two detected auxiliary pilot symbols $\tilde{A}_7$ and $\tilde{A}_8$.

Figure 5:
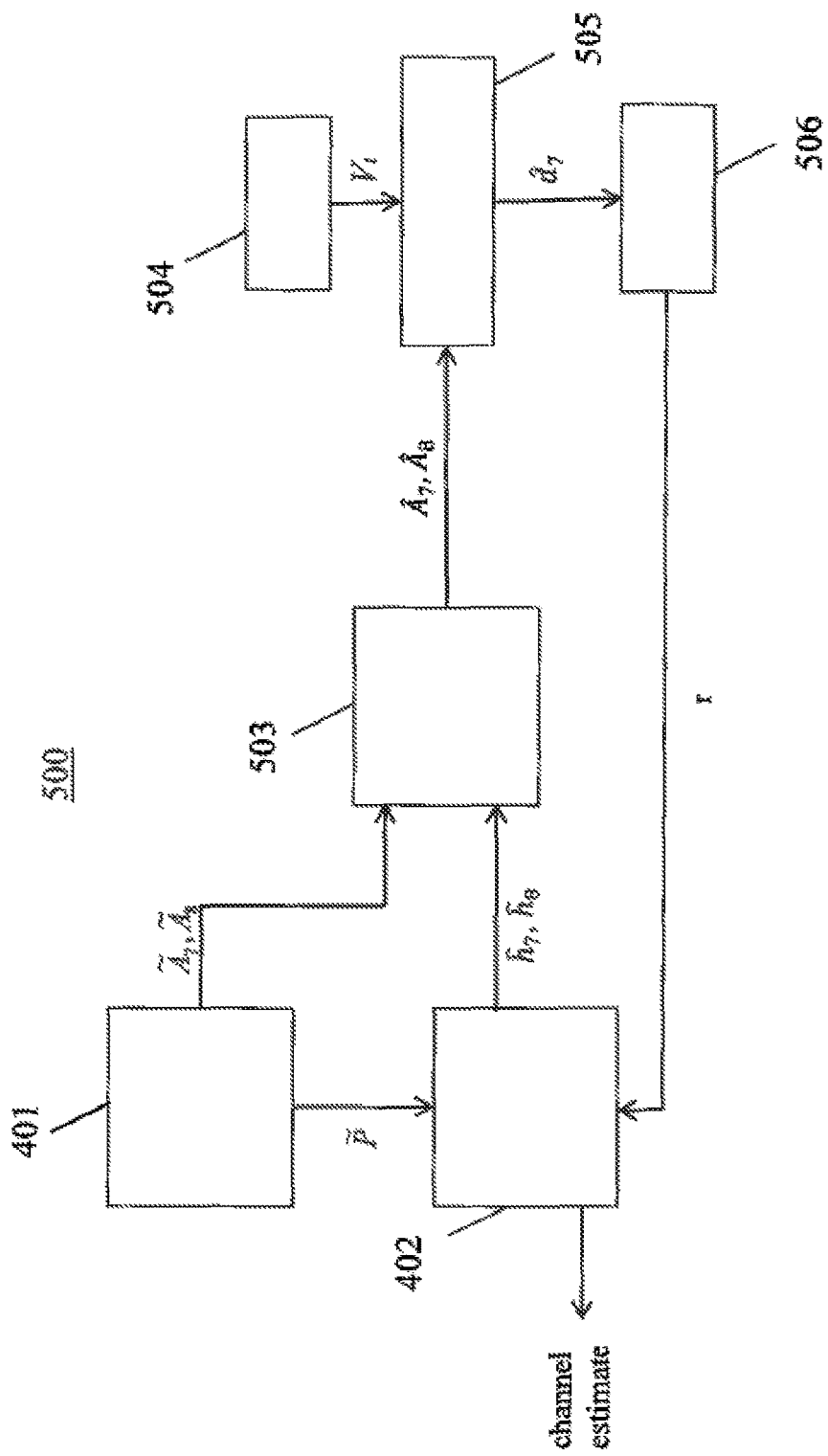
FIG. 5 shows a receiver according to an embodiment of the present invention.

FIG. 5 shows a receiver 500 according to a further embodiment of the present invention. The receiver 500 shown in FIG. 5 reflects an optional and more detailed implementation of the receiver 400 of FIG. 4. In particular, the receiver 500 shown in FIG. 5 also includes the analyzer 401 and the channel estimator 402.

The receiver 500 of FIG. 5 further includes preferably an equalizer 503, which is adapted to calculate two equalized auxiliary pilot symbols $\hat{A}_7$ and $\hat{A}_8$ based on the two detected auxiliary pilot symbols $\tilde{A}_7$ and $\tilde{A}_8$ received from the analyzer 401, and based on the two channel estimates $\hat{h}_7$ and $\hat{h}_8$ received from the channel estimator 402.

The receiver 500 further includes a detector 505, which is at least adapted to extract from the two detected auxiliary pilot symbols $\tilde{A}_7$ and $\tilde{A}_8$ the payload information. In particular, the detector 505 is adapted to extract the payload information $\hat{d}_7$ from the two equalized auxiliary pilot symbols $\hat{A}_7$ and $\hat{A}_8$ received from the equalizer 503. The extracted payload symbol $\hat{d}_7$ corresponds to the payload symbol $d_7$ included into the auxiliary pilot symbols $A_7$ and $A_8$ on the transmitter side, i.e. is the detected version of $d_7$, which may be different due to the imperfect transmission channel. Preferably, the detector 505 is adapted to extract the payload information $\hat{d}_7$ by performing a combining operation on the two equalized auxiliary pilot symbols $\hat{A}_7$ and $\hat{A}_8$. The detector 505 may also be supplied from a de-twister 504 with the twisting vector $V_t$, and may be configured to extract the payload information $\hat{d}_7$ from the two equalized auxiliary pilot symbols $\hat{A}_7$ and $\hat{A}_8$ using the twisting vector $V_t$. The de-twister 504 may also provide a vector, which reverses the factor of twisting by the twisting vector $V_t$.

The receiver 500 of FIG. 5 finally includes an interference estimator 506, which is at least adapted to calculate an interference estimation r of the interference from the two auxiliary pilot symbols $A_7$ and $A_8$ on the main pilot symbol P, or respectively based on the detected main pilot symbol $\tilde{P}$ and the detected auxiliary pilot symbols $\tilde{A}_7$ and $\tilde{A}_8$. The interference estimator 506 may particularly feedback the interference estimation r to the channel estimator 402, in order to allow the channel estimator 402 to estimate the channel response of the transmission channel based on the main pilot symbol P and the interference estimation r, or respectively based on the detected main pilot symbol $\tilde{P}$ and the interference estimation r.

In the following, individual method steps that may be performed by the receiver 500 of FIG. 5, in order to obtain an optimized channel estimate, are described.

Firstly, based on the received detected main pilot symbol $\tilde{P}$ from the OQAM AFB, the channel estimator 402 estimates the channel response on the P-th subcarrier, on time instants corresponding to the positions of the auxiliary pilot symbol pair $A_7$ and $A_8$. These channel estimates are denoted $\hat{h}_7$ and $\hat{h}_8$, respectively.

Secondly, based on the acquired channel coefficients $\hat{h}_7$ and $\hat{h}_8$, and received detected auxiliary pilot symbols $\tilde{A}_7$ and $\tilde{A}_8$, the equalizer 503 estimates $\hat{A}_7$ and $\hat{A}_8$, e.g. by channel inversion, and the detector 505 detects the payload information $\hat{d}_7$. Preferably, the payload information is detected by combining. For instance, the following estimation of the detected payload information $\hat{d}_7$ can be made:

$$\hat{d}_7 = \frac{\hat{A}_7}{V_{t,1}} - \frac{\hat{A}_8}{V_{t,2}}$$

The estimated (and, optionally, in addition hard-detected) detected payload information $\hat{d}_7$ will then be fed back to the interference estimator 506, to estimate the intrinsic interference from the detected auxiliary pilot symbols $\tilde{A}_7$ and $\tilde{A}_8$ to the main pilot symbol P. This interference estimate r can, for instance, be done by calculating $$\hat{r} = \hat{d}_7 \lfloor f_p(t) * \hat{h} * g_p(t) \rfloor_{\downarrow \frac{1}{2} N_{FFT}}$$

where $\hat{r}$ is the interference from the payload information $d_7$ to the main pilot symbol P, $f_p(t)$ and $g_p(t)$ are the equivalent transmitting and receiving prototype filter on the P-th subcarrier, (*) denotes a convolution, $\hat{h}$ is the estimated channel response in the time domain, and $N_{FFT}$ is the size of fast Fourier transformation (FFT) for the system.

Thirdly, the pilot symbol and corresponding channel response estimation are updated as $$\tilde{\tilde{P}} = \tilde{P} - r.$$

Herein, $\tilde{\tilde{P}}$ is the updated receiving main plot symbol.

Fourthly, the previous three steps are repeated until the maximal allowed iteration number is reached, or until a dedicated value, for example the value of the intrinsic interference, converges. That means the receiver 500, and particularly the channel estimator 402, is adapted to iteratively estimate the channel response of the transmission channel based on the main pilot symbol P and the interference estimation r. The receiver 500 may also perform iteration steps until a difference between at least one of the two channel estimates calculated in one iteration step and said at least one channel estimate calculated in a preceding iteration step is below a predetermined threshold value, or until a predetermined maximum number of iteration steps is reached.

Figure 6:
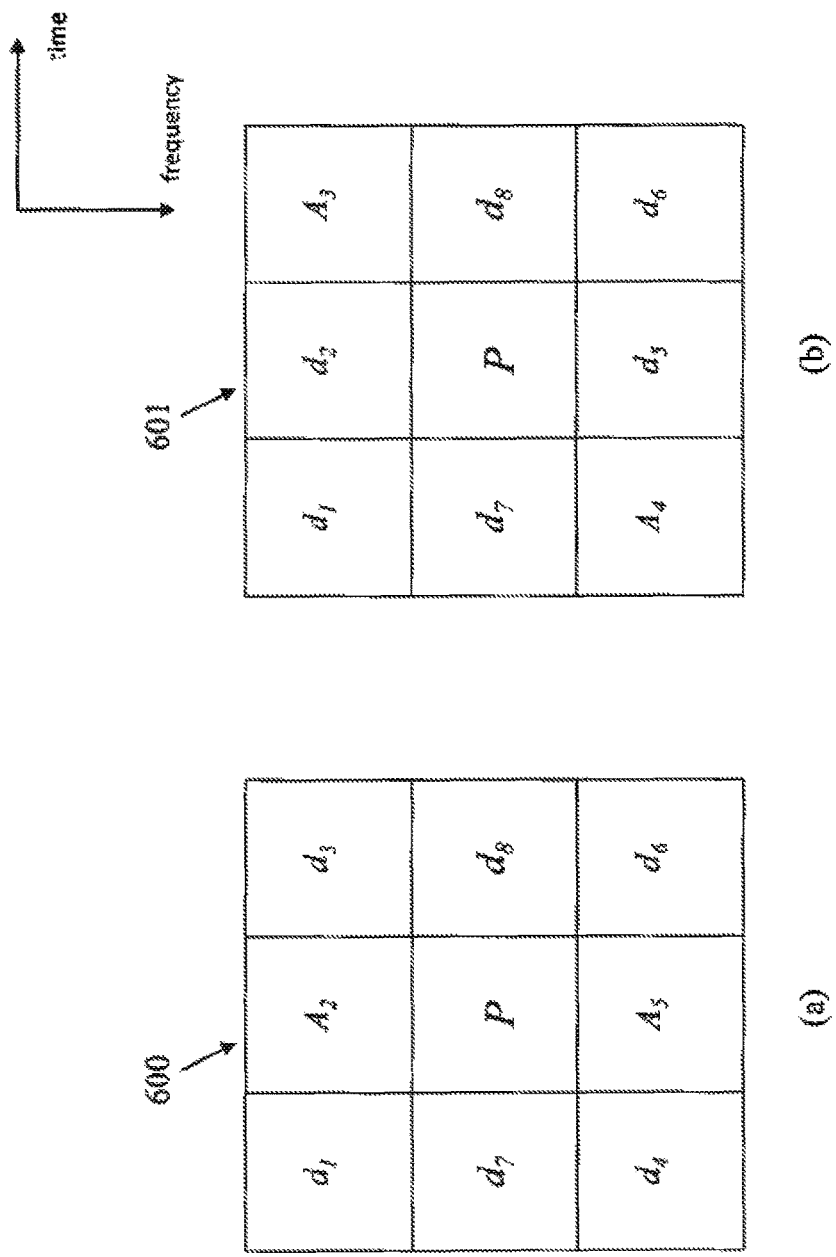
FIG. 6 shows in (a) and (b) symbol structures with a main pilot symbol and two auxiliary pilot symbols as used by embodiments of the present invention.

In FIG. 6, the proposed symbol structure 300 design is adapted to different channel conditions, and in particular different prototype filter selection. That means, FIG. 6 presents alternative symbol structure designs 600 and 601. The symmetric insertion positions of the auxiliary pilot symbols $A_7$ and $A_8$, preferably symmetric in the time domain, i.e. "horizontally" placed as depicted for the symbol structure 300 in FIG. 3 can also be symmetric in the frequency domain, i.e. placed "vertically" as shown for the symbol structure 600 in (a), or symmetric in both time and frequency domain, i.e. placed "diagonally" as shown for the symbol structure 601 in (b). The motivation of such an adaptation may be to cover different cases for the most influential symbol pair positions in view of intrinsic interference on the main pilot symbol P, which are caused by different localization properties of prototype filters and channel conditions.

Moreover, the proposed pilot symbols can also harmonically coexist with other scattered pilot designs. In particular, in this case the receivers 400 or 500 can perform the same receiving process as in the state of the art without preknowledge of the pilot structure.

Embodiments of the present invention have been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A Transmitter for filterbank multicarrier (FBMC) communication, comprising:
a processor, configured to determine two auxiliary pilot symbols,
a precoder configured to insert the two determined auxiliary pilot symbols into a symbol structure of symbols, the symbols adjacently surrounding a main pilot symbol,
wherein the precoder is configured to insert the two auxiliary pilot symbols at two symbol positions of the symbol structure, which are symmetric to the main pilot symbol in at least one of a time domain and a frequency domain,
wherein the processor is configured to include interference information in at least one of the two determined auxiliary pilot symbols, and
wherein the interference information is determined based on payload information carried by remaining other symbols of the symbol structure, in order to compensate for intrinsic interference affecting the main pilot symbol.

2. The transmitter according to claim 1, wherein the processor is configured to divide the interference information between the two auxiliary pilot symbols.

3. The transmitter according to the claim 1, wherein the processor is configured to include payload information associated with one of the symbols into at least one of the two auxiliary pilot symbols.

4. The transmitter according to claim 3, wherein the processor is configured to divide the payload information between the two auxiliary pilot symbols.

5. The transmitter according to claim 3, wherein the processor is configured to twist the payload information included in at least one of the two auxiliary pilot symbols through a twisting vector.

6. The transmitter according to claim 5, wherein the processor is configured to obtain the two auxiliary pilot symbols according to the following formulas $$A_7 = \frac{1}{2}(d_7)V_{t,1} - \frac{1}{2}\sum_{i\in\Omega\setminus\{7,8\}} \frac{d_i\gamma_i}{\gamma_7}$$

$$A_8 = \frac{1}{2}(-d_7)V_{t,2} - \frac{1}{2}\sum_{i\in\Omega\setminus\{7,8\}} \frac{d_i\gamma_i}{\gamma_8}$$

where $A_7$ demonstrates a first auxiliary pilot symbol, $A_8$ demonstrates a second auxiliary pilot symbol, the twisting vector $V_t=[V_{t,1}, V_{t,2}]$, $d_7$ demonstrates the included payload information, $\Omega$ demonstrates a set of neighboring resource grids influencing the main pilot symbol, the payload information $d_i$ carried by remaining symbols of the symbol structure, and $\gamma_i$ demonstrates filter bank response information.

7. A receiver for filterbank multicarrier (FBMC) communication, comprising:
an analyzer, configured to extract from at least one FBMC data packet received via a transmission channel a main pilot symbol and two auxiliary pilot symbols included in a symbol structure of symbols, the symbols adjacently surrounding the main pilot symbol,
a channel estimator configured to estimate a channel response of the transmission channel based on the main pilot symbol and the two auxiliary pilot symbols;
a detector configured to extract from the two auxiliary pilot symbols payload information associated with one symbol, and
an interference estimator configured to determine an interference estimation of an interference from the two auxiliary pilot symbols on the main pilot symbol,
wherein the channel estimator is configured to estimate the channel response of the transmission channel based on the main pilot symbol and the interference estimation.

8. The receiver according to claim 7, further comprising:
an equalizer, configured to determine two equalized auxiliary pilot symbols based on the two auxiliary pilot symbols received from the analyzer and based on two channel estimates associated with at least one of time and frequency instants of the two auxiliary pilot symbols, wherein the two channel estimates are determined by and sent from the channel estimator,
wherein the detector is configured to extract the payload information from the two equalized auxiliary pilot symbols.

9. The receiver according to claim 8, further comprising:
a de-twister configured to supply a twisting vector to the detector,
wherein the detector is configured to extract the payload information from the two equalized auxiliary pilot symbols through the twisting vector.

10. The receiver according to claim 8, wherein the channel estimator is configured to iteratively estimate the channel response of the transmission channel based on the main pilot symbol and the interference estimation until one of the following situations occurs:
(a) a difference between at least one of the two channel estimates and at least one previously determined channel estimate is below a predetermined threshold value, and
(b) a predetermined maximum number of the iteratively estimating is reached.

11. A transmission method for filterbank multicarrier (FBMC) communication, comprising:
determining two auxiliary pilot symbols,
inserting the two determined auxiliary pilot symbols into a symbol structure of symbols, the symbols adjacently surrounding a main pilot symbol,
wherein the two auxiliary pilot symbols are inserted at two symbol positions of the symbol structure, which are symmetric to the main pilot symbol in at least one of a time domain and a frequency domain;
including interference information in at least one of the two determined auxiliary pilot symbols,
wherein the interference information is determined based on payload information carried by remaining symbols of the symbol structure, to compensate for intrinsic interference, affecting the main pilot symbol.

12. The transmission method according to the claim 11, further comprising:
including payload information associated with one symbol in at least one of the two auxiliary pilot symbols.

13. A reception method for filterbank multicarrier (FBMC) communication, comprising:
extracting from at least one FBMC data packet received via a transmission channel a main pilot symbol and two auxiliary pilot symbols included in a symbol structure of symbols, the symbols adjacently surrounding the main pilot symbol, estimating a channel response of the transmission channel based on the main pilot symbol and based on the two auxiliary pilot symbols;

extracting from the two auxiliary pilot symbols payload information associated with one symbol, and determining an interference estimation of the interference from the two auxiliary pilot symbols on the main pilot symbol, wherein the estimating the channel response of the transmission channel based on the main pilot symbol and based on the two auxiliary pilot symbols comprises:

estimating the channel response of the transmission channel based on the main pilot symbol and the interference estimation.

14. The reception method according to claim 13, further comprising:

determining two equalized auxiliary pilot symbols based on the two auxiliary pilot symbols and based on two channel estimates associated with at least one of time and frequency instants of the two auxiliary pilot symbols;

wherein the extracting from the two auxiliary pilot symbols payload information associated with one symbol comprises:

extracting the payload information from the two equalized auxiliary pilot symbols.

15. The reception method according to claim 14, further comprising:

obtaining a twisting vector, wherein the extracting the payload information from the two equalized auxiliary pilot symbols comprises:

extracting the payload information from the two equalized auxiliary pilot symbols using the twisting vector.

16. The reception method according to claim 14, wherein the estimating a channel response of the transmission channel based on the main pilot symbol and based on the two auxiliary pilot symbols comprises:

iteratively estimating the channel response of the transmission channel based on the main pilot symbol and the interference estimation until one of the following situations happens:

(a) a difference between at least one of the two channel estimates and at least one previously determined channel estimate is below a predetermined threshold value, and (b) a predetermined maximum number of iteratively estimating is reached.

* * * * *